United States Patent
Yamamoto (10) Patent No.: US 7,619,976 B2
(45) Date of Patent: Nov. 17, 2009

(54) DATA TRANSMISSION METHOD AND DATA TRANSMISSION APPARATUS

(75) Inventor: Katsuya Yamamoto, Chiba (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 450 days.

(21) Appl. No.: 11/023,492

(22) Filed: Dec. 29, 2004

(65) Prior Publication Data

US 2005/0157696 A1    Jul. 21, 2005

(30) Foreign Application Priority Data

Jan. 15, 2004    (JP)    ............... 2004-008420

(51) Int. Cl.
*G01R 31/08* (2006.01)
*H04B 7/00* (2006.01)

(52) U.S. Cl. ........................ 370/236; 455/70

(58) Field of Classification Search ........ 370/229, 370/230.1, 232, 233, 235, 252, 253, 389, 370/278, 282, 394, 337, 236, 230, 295, 338, 370/428, 473; 455/76, 77, 423, 68, 522, 455/70; 709/227; 714/708, 752, 786
See application file for complete search history.

(56) References Cited

U.S. PATENT DOCUMENTS

| | | | | |
|---|---|---|---|---|
| 5,072,297 | A * | 12/1991 | Kanazawa et al. | 348/480 |
| 5,828,672 | A * | 10/1998 | Labonte et al. | 714/708 |
| 6,661,998 | B1 * | 12/2003 | Hunzinger et al. | 455/68 |
| 6,757,245 | B1 * | 6/2004 | Kuusinen et al. | 370/230 |

(Continued)

FOREIGN PATENT DOCUMENTS

EP    1 349 329 A2    10/2003

(Continued)

OTHER PUBLICATIONS

Hua Xu, et al. "Performance Analysis on the Radio Link Control Protocol of UMTS System" 2002 IEEE 56th. Vehicular Technology Conference Proceedings, XP-010608787, Sep. 24, 2002, pp. 2026-2030.

(Continued)

*Primary Examiner*—Aung S Moe
*Assistant Examiner*—Awet Haile
(74) *Attorney, Agent, or Firm*—Oblon, Spivak, McClelland, Maier & Neustadt, L.L.P.

(57) ABSTRACT

When retransmission requests are issued based on the results of error-correction decoding of received data packets to perform data transmission, statistical information indicating whether received data packets have been successfully decoded or have not been decoded is acquired, and based on the rate at which correct decoding has been made or the rate at which correct decoding has not been made, which is obtained from the statistical information, a request is transmitted to the transmission source to change the window size, which is the number of data units handled in a predetermined layer, so that when for example the communication environment is not excellent, processing can be performed at a small window size, and the occurrence of circumstances in which data retransmission and the discarding of received data are repeated can be efficiently prevented. Accordingly, data transmission efficiency in a wireless transmission system performing high-speed data transmission is improved under conditions of a poor radio wave environment.

12 Claims, 7 Drawing Sheets

U.S. PATENT DOCUMENTS

| | | | |
|---|---|---|---|
| 6,798,842 B2 * | 9/2004 | Jiang ........................... | 375/295 |
| 6,859,449 B2 * | 2/2005 | Gronberg et al. ............ | 370/338 |
| 6,868,064 B2 * | 3/2005 | Yi et al. ....................... | 370/236 |
| 6,891,818 B1 * | 5/2005 | Jarvisalo et al. ............ | 370/337 |
| 7,085,540 B2 * | 8/2006 | Cao et al. ..................... | 455/68 |
| 7,096,402 B2 * | 8/2006 | Yano et al. ................... | 714/755 |
| 7,187,677 B2 * | 3/2007 | Torsner et al. ............... | 370/394 |
| 2002/0147025 A1 * | 10/2002 | Savas .......................... | 455/522 |
| 2003/0063564 A1 * | 4/2003 | Ha et al. ....................... | 370/230 |
| 2003/0126546 A1 * | 7/2003 | Fujita et al. ................. | 714/786 |
| 2003/0169741 A1 * | 9/2003 | Torsner et al. .............. | 370/394 |
| 2003/0199249 A1 * | 10/2003 | Cao et al. ..................... | 455/39 |
| 2004/0039979 A1 * | 2/2004 | Garani ........................ | 714/752 |
| 2004/0042492 A1 * | 3/2004 | Suzuki et al. ................ | 370/473 |
| 2004/0148396 A1 * | 7/2004 | Meyer et al. ................. | 709/227 |
| 2004/0157595 A1 * | 8/2004 | Kruger ........................ | 455/423 |
| 2004/0190540 A1 * | 9/2004 | Miyake et al. ............... | 370/428 |

FOREIGN PATENT DOCUMENTS

| | | |
|---|---|---|
| JP | 2002-124917 | 4/2002 |
| JP | 2002-271303 | 9/2002 |

OTHER PUBLICATIONS

Robert Bestak, et al. "RLC Buffer Occupancy When Using a TCP Connection Over UMTS" Personal, Indoor and Mobile Radio Communications, 2002, XP-010611445, pp. 1161-1165.

* cited by examiner

DATA TRANSMISSION METHOD AND DATA TRANSMISSION APPARATUS

BACKGROUND OF THE INVENTION

1. Field of the Invention

This invention relates to a transmission method and a transmission apparatus suitable for application to wireless transmission processing in which retransmission control is performed.

2. Description of the Related Art

Channel encoding (error-correction encoding) and automatic repeat request (ARQ) are known as methods of error control in wireless transmission applied to wireless telephone communication and other systems. In packet transmission, error-free transmission is necessary, so that error control must be performed using ARQ. Further, when applying adaptive modulation/demodulation and error correction to select the optimum modulation method and encoding method according to the propagation path conditions in order to improve throughput, packet errors arising due to measurement errors, control delays and other causes are unavoidable; hence as described in non-patent reference 1, a technology called HARQ (Hybrid ARQ) which incorporates error correction functions has been developed.

HARQ is a retransmission method in which retransmission using ARQs provided by an upper layer of a conventional wireless protocol or similar is executed by the physical layer, and is further combined with error correction functions to be performed. By this means, the reliability of data provided to the upper layer by the physical layer can be improved. In ARQ retransmission technology in the upper layer, conventionally data for which there has been reception failure is discarded, and data retransmission is awaited; however in HARQ, data for which there has been reception failure is held in an error corrector as data before decoding, and is synthesized with retransmitted data to perform decoding. By synthesizing data for which reception has failed and retransmitted data, the data likelihood, which indicates the reliability of the data, can be improved, and the probability of successful decoding can be increased.

Here, an example of wireless data communication to which HARQ is applied is explained. As wireless data communication to which HARQ is applied, it is proposed that high-speed downlink packet access (hereafter HSDPA), which enables high-speed downlink data transmission to be performed, be applied for example to a universal mobile telephone communication system (UMTS system) to which W-CDMA has been applied.

In HSPDA, protocol data units (hereafter "PDUs") which have been correctly decoded using HARQ functions are rearranged in order of the transmission sequence number (hereafter "TSN") included in the PDU header information, and are transferred to the upper-layer protocol. HARQ processing and TSN rearrangement functions before transfer to the upper layer are obtained in a MAC (Media Access Control) layer. Protocol data units (PDUs) in the MAC layer are called MAC-PDUs. MAC-PDUs may be MAC-hs PDUs for the portion relating to the HSDPA method, and MAC-d PDUs for individual data transmission channels (DCHs) existing in the UMTS system before the introduction of HSDPA; and MAC-hs PDUs are configured to include a plurality of MAC-d PDUs.

Figure 1:
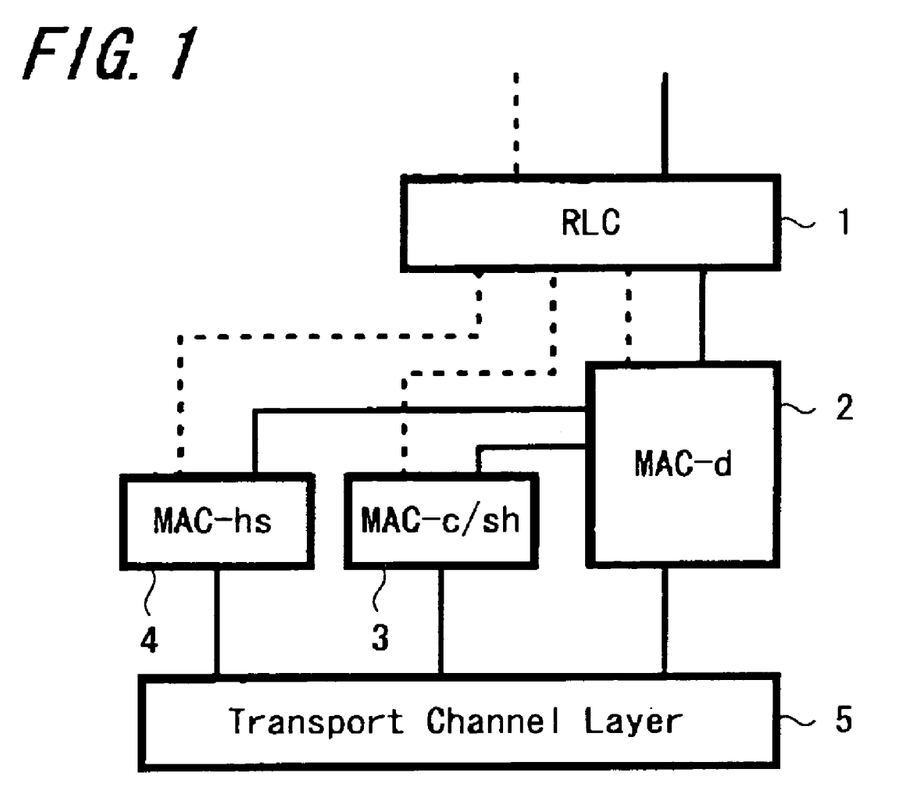
FIG. 1 is an explanatory diagram showing an example of a portion of the layer structure in a UMTS terminal.

An example of the layer configuration in this HSDPA method is explained, referring to FIG. 1. In FIG. 1, solid lines indicate data flows, and broken lines indicate control information flows. As shown in FIG. 1, there is a radio link control (hereafter "TRLC") layer 1 in the layer above the MAC layer, which is the layer relating to HARQ functions; as the MAC layer, a MAC-d layer 2, MAC-c/sh layer 3, and MAC-hs layer 4 are prepared. Below the MAC layers, a transport channel layer 5 is provided.

The transport channel layer 5 has a function for receiving data from the physical layer, and a function for transmitting data to the physical layer. The MAC-hs layer 4 transfers MAC-hs PDUs in HSDPA to the MAC-d layer 2 in order. In the MAC-c/sh layer 3, data received through a common/shared channel is transferred to the MAC-d layer 2. The MAC-d layer 2 transfers MAC-d PDUs to the RLC layer 1. Each of the MAC layers also exchanges control information with the RLC layer 1, as indicated by broken lines in FIG. 1. The MAC-c/sh layer is not directly related to the processing of the present invention described later on, and therefore the specific processing performed is not here explained.

Figures 2A, 2B:
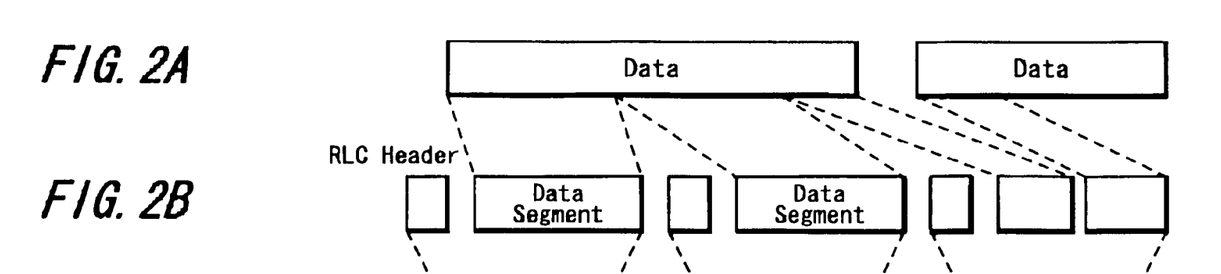
FIGS. 2A to 2E are explanatory diagrams showing the relations between a MAC-hs PDU, MAC-d PDU, and RLC PDU.
Figure 2C:
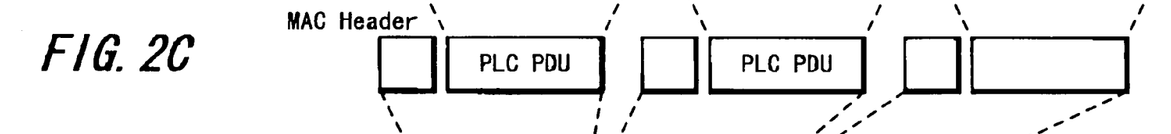

FIGS. 2A to 2E show the relations between protocol data units (PDUs) in HSPDA, that is, the relations between MAC-hs PDUs, MAC-d PDUs, and RLC PDUs. Data supplied as shown in FIG. 2A is divided into data segments in predetermined data quantity units as shown in FIG. 2B, and an RLC (Radio Link Control) header is added to each data segment. SN (Sequence Number) values for rearranging RLC PDUs (RLC Protocol Data Units) in order are included in the RLC header portions. The data to which the RLC header is added is sent to the MAC-d layer as an RLC PDU, and the MAC header is added, as shown in FIG. 2C.

Figure 2D:
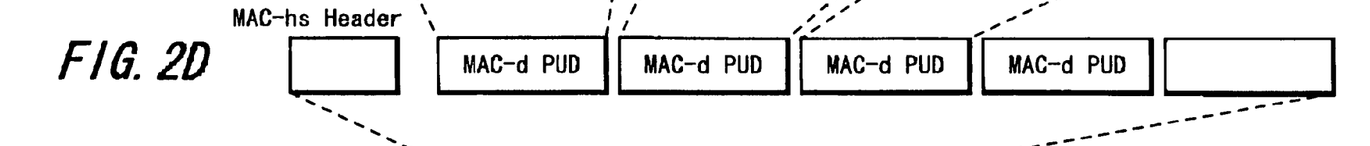
Figure 2E:
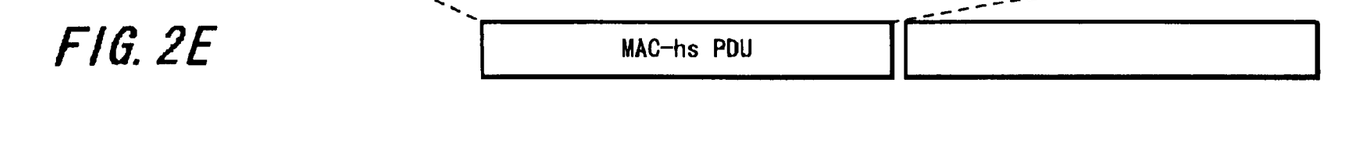

The data to which the MAC header has been added is sent, as a MAC-d PDU (MAC-d protocol data unit), to the MAC-hs layer; as shown in FIG. 2D, a MAC-hs header is added to each predetermined unit, and as shown in FIG. 2E, the data is sent to the lower layer (transport channel layer) as a MAC-hs PDU (MAC-hs protocol data unit), and transmission processing is performed. At the time of reception, processing is performed in the direction opposite to the flow from FIGS. 2A to 2E, data units of the different protocols are identified in the data obtained from the transport channel layer, and the data shown in FIG. 2A is extracted.

Non-patent reference 1: Keiji Tachikawa, W-CDMA Idou Tsuushin Houshiki, Maruzen Shuppan, Jun. 25, 2001, pp. 48-50.

However, in an actual mobile wireless communication system, data transmission errors normally occur due to changes in and degradation of the radio wave propagation environment, as a result of fading, multipath interference, and other causes. As a result, at the receiving-side terminal, PDUs in which TSN (Transmission Sequence Number) and SN are missing occur in the reception portions of the MAC-hs layer and RLC layer, and so buffering is performed until the retransmitted PDUs can be received.

In the HSPDA method, it is stipulated that this buffering be managed in the MAC-hs layer through TSN values and a timer. In the MAC-hs layer, if MAC-hs PDUs have been received within the stipulated TSN window, and TSN values have been received in order, then these are passed to the MAC-d layer. When a MAC-hs PDU is received with a missing TSN value in the TSN window, the timer T1 is started with respect to the MAC-hs PDU with the data unit for the sequence number in the missing state.

The timer T1 is a dedicated timer managed by the MAC-hs layer, in which the timer value is set by the UMTS system to values from, for example, 10 ms to 400 ms, and issues instructions to terminals. The timer T1 has settings, in which reception of a MAC-hs PDU with missing TSN value is awaited until the end of the stipulated active time of the timer T1; however, when the timer T1 finishes counting the stipulated time, the MAC-hs layer abandons reception of MAC-hs PDUs with missing TSN value, and the MAC-hs PDUs remaining in the buffer are passed to the MAC-d layer.

On the other hand, in the RLC (Radio Link Control) layer, it is stipulated that management be performed using the SN (Sequence Number) values in RLC headers, retransmit timer, and retransmit times upper-limit count value. In the RLC layer, if RLC PDUs can be received within the stipulated SN window and the reception is performed in the order of SN values, then the data is passed to the upper-layer application. The SN window is set by the UMTS system to a value of for example 1 to 4095, issuing instructions to terminals. In the RLC layer of a receiving terminal, when an RLC PDU with a missing SN value is detected, a retransmission request is sent to the transmitting side using the control PDU. In the RLC layer on the transmitting side, if the retransmission request is accepted, the PDU, specified using the missing SN number, is retransmitted. It is further stipulated that, if the retransmission request at the receiving-side terminal or the retransmission on the transmitting side fails after a stipulated number of executions, then the received data accumulated in the buffer is discarded in the RLC layer. As a result, in cases where the radio wave environment is degraded, there is the problem that a vicious circle may occur in buffer management, with a state arising in which data accumulation and data discarding are repeated in the buffer of the RLC layer.

An example of the state in which the above problem occurs is explained, referring to FIGS. 3A to 3J. FIGS. 3A through 3E describe the states of the terminal on the data receiving side; FIGS. 3F through 3J describe the states of the base station which is the data transmitting side.

In FIGS. 3A to 3J, the horizontal axis is the time axis, and the transmission time intervals (hereafter called "TTIs") of the physical channels are stipulated by the UMTS system. For example, values of 2 ms for HSDPA-related physical channels, and of 10 ms, 20 ms, 40 ms, or 80 ms are stipulated for individual channels (hereafter "DCHs"). In the example of FIGS. 3A to 3J, the TTI for the uplink DCH, for transmission to a base station, is set to 10 ms. Time differences are set as offsets determined by the system for the TTI boundaries of the physical channels. The SN (Sequence Number) window in the RLC layer may be for example 2047, a value actually used in services, and is set to a considerably large number.

Figure 3A:
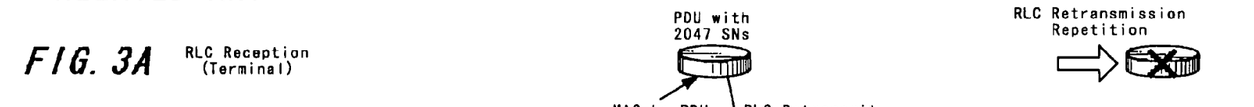
FIGS. 3A to 3J are timing charts showing a conventional data transmission example in a case in which the radio wave environment is not excellent.
Figure 3B:
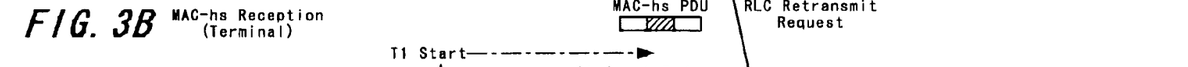
Figure 3C:
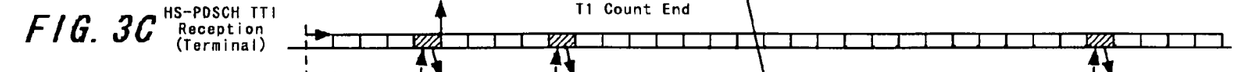
Figure 3D:
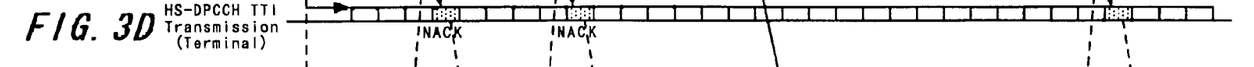
Figure 3E:
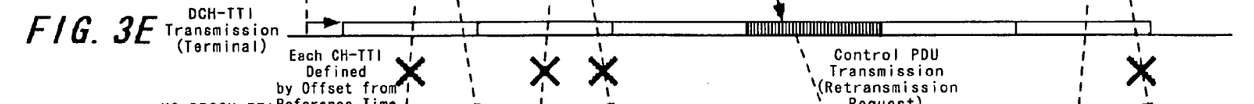
Figures 3F, 3G:
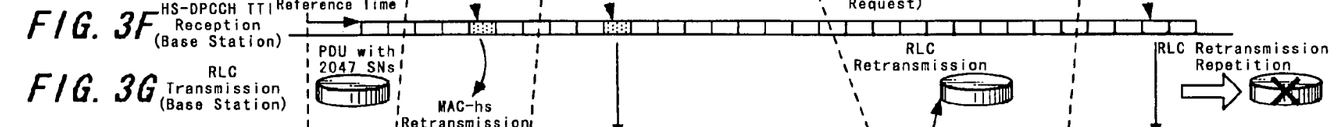
Figures 3H, 3I, 3J:
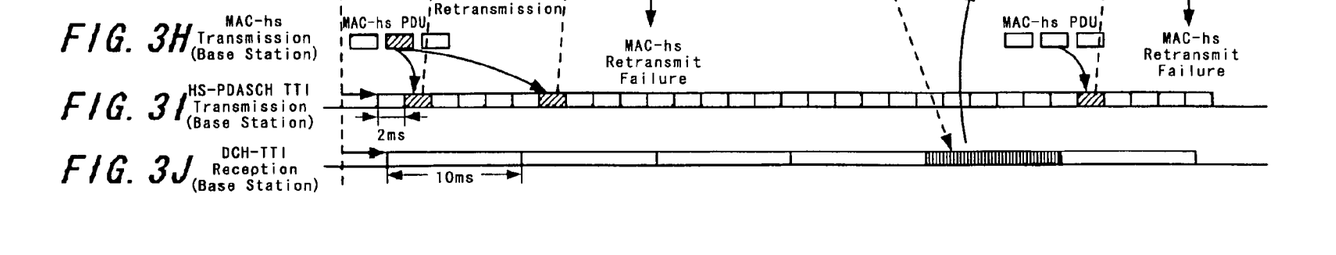

As shown in FIGS. 3G and 3H, in the base station-side RLC layer, transmission RLC PDUs within the SN window are sent in succession to the transmission MAC-hs layer; the PDUs are processed as MAC-hs PDUs to be arranged at predetermined positions of the transmission channel at 2 ms intervals as shown in FIG. 3I; and are transmitted. The positions (intervals) of arrangement in the channel are determined depending on each transmission destination terminal.

Signals transmitted from the base station are received at predetermined positions of the receiving channel at the 2 ms intervals indicated in FIG. 3C. When it is assumed that at this time data have not been received (decoded) correctly on the receiving side, as indicated by an "x" symbol in FIGS. 3A to 3J. If data have not been received correctly, reception-not-acknowledged (NACK) is transmitted to the base station from the terminal on the transmitting channel, as shown in FIG. 3D. When transmission of data on the receiving channel is begun, the timer T1 is started.

NACK data transmitted from the terminal is received by the base station on the physical receiving channel, as shown in FIG. 3F. When this NACK data is received by the base station, the MAC-hs PDU with the same sequence number (SN) is resent with the timing allocated to the terminal which is the transmission target, as shown in FIG. 3I.

At this time, as indicated by an "x" symbol in FIGS. 3A to 3J, if correct data reception (decoding) has not been made either on the reception side with respect to the resent retransmitted MAC-hs PDU, similarly to the previous case, NACK data is transmitted from the terminal to the base station; here however, as indicated by the "x" symbol in the figures, it is assumed that the uplink transmission of the NACK data results in an error, so that the NACK data cannot be discriminated at the base station. In this case, the base station does not retransmit the MAC-hs PDU.

Upon entering such a state, as indicated in FIG. 3C, the data with the sequence number (SN) in question cannot be received before the end of counting by the timer T1 which has been started, and as indicated in FIG. 3B, the MAC-hs PDUs accumulated in the receiving buffer are sent to the RLC layer. In the RLC layer, as shown in FIG. 3A, because there is an omission among the transferred PDUs, a control PDU including a retransmission request is transmitted on the transmission channel from the terminal to the base station, as indicated in FIG. 3E.

On the base station side, as shown in FIG. 3J, upon receiving the control PDU including the retransmission request, processing to retransmit the RLC PDU is performed in the RLC layer as shown in FIG. 3G; a MAC-hs PDU is generated in the MAC-hs layer as shown in FIG. 3H, and as shown in FIG. 3I, this MAC-hs PDU is transmitted on the transmission channel.

Thereafter, if this transmitted PDU likewise cannot be normally received (decoded) on the terminal side, retransmission processing is repeated in the RLC layer of the base station, and data accumulated in the buffer is discarded in the RLC layer on the terminal side.

Note that in the example of FIGS. 3A to 3J, in order to make the explanation simplified, a case is shown in which processing is repeated upon failure to retransmit one MAC-hs PDU, indicated by the diagonal shading in FIG. 3I; however in practical use, retransmission processing is performed in parallel for a plurality of MAC-hs PDUs simultaneously.

Thus when MAC-hs PDU retransmission is repeated and uplink NACK transmission ends in failure, the timer T1 is started again and again, and when the timer which is frequently started completes counting, the received MAC-hs PDUs which are buffered in the MAC-hs layer of the terminal are passed to the MAC-d layer and RLC layer, with TSNs (Transmission Sequence Numbers) still discontinuous.

As already explained, the buffer (SN window) in the RLC layer is set to a comparatively large volume; for example, in a UMTS system, the SN window is set so as to handle 2047 PDUs. If sequence numbers (SN) are missed in succession in this SN window, the number of PDUs for RLC retransmission requests similarly increases significantly. When there is degradation of the radio wave environment, even if RLC retransmission is performed, there is a high probability that missing SNs will not be resolved within the RLC stipulated time. Further, if one missing sequence number cannot be resolved, RLC data for subsequent sequence numbers which have been received correctly is discarded, so that data transmission efficiency is significantly degraded. That is, in cases in which the radio environment is degraded, a vicious circle may be entered in which data accumulation in the RLC buffer and data discarding are repeated. As a result, an HSDPA service characterized by high-speed data transmission can no longer be obtained.

This invention was devised in light of the above problems, and has as an object to improve data transmission efficiency under circumstances of a poor radio wave environment in this type of wireless transmission system.

SUMMARY OF THE INVENTION

This invention is a data transmission method and a data transmission apparatus, in which, when retransmission requests are issued based on the results of error-correction decoding of received data packets and transmission is performed, statistical information indicating whether or not the received data packets have been decoded is acquired, and based on the rate at which correct decoding has or has not been performed derived from this statistical information, a request to change the window size, which is the number of data units handled in the predetermined layer, is transmitted to the transmitting source.

Accordingly, the window size, which is the number of data units handled in the predetermined layer, can be changed in accordance with the radio wave environment at that time, so that for example the data amount accumulated in the receiving-side buffer can be controlled to be an appropriate amount of data.

According to this invention, the window size, which is the number of data units handled in the predetermined layer, is changed according to the radio wave environment at that time, so that for example the data amount accumulated in the receiving-side buffer can be controlled to be an appropriate amount of data; hence a situation in which received data in the receiving-side buffer is discarded can be prevented, to the extent possible.

That is, when for example the rate at which correct decoding has not been made is greater than a stipulated value, or the rate at which correct decoding has been made is equal to or less than a stipulated value, as a window size change request, the radio link control layer (RCL layer) protocol is used to issue a request to decrease the window size, so that when the radio wave environment is not excellent, the amount of data accumulated in the buffer of the RCL layer on the receiving side is decreased, and processing is performed in small data amount units. Accordingly, the occurrence of repeated data transmission and of repeated data discarding due to incomplete received data can be reduced. As a result, degradation of the data transmission efficiency can be prevented, and efficient data transmission can be performed.

Further, as a window size change request, the radio link control layer protocol is used to issue a change request to increase the window size when the rate at which correct decoding has not been made is equal to or lower than a stipulated value, or when the rate at which correct decoding has been made is greater than a stipulated value, so that when the radio wave environment is in an excellent state, the amount of data accumulated in the receiving-side RLC buffer is increased. Accordingly, efficient data processing suitable for high-speed transmission processing can be performed in comparatively large data amount units.

Further, the rate at which correct decoding has been made or the rate at which correct decoding has not been made, which is indicated by statistical information, is described based on the number which has been correctly decoded or the number which has not been correctly decoded within the closest fixed time interval, so that there is the advantage that the window size can be controlled appropriately based on the most recent reception conditions.

Furthermore, in the above case the number which has been correctly decoded or the number which has not been correctly decoded within the closest fixed time interval is described based on the number of time intervals with the reception timing allocated to the relevant terminal, so that the state of reception at the terminal in each timing interval can be judged to perform judgment on the most recent reception conditions more accurately.

DESCRIPTION OF THE PREFERRED EMBODIMENTS

Hereinafter, an embodiment of the invention is explained, referring to FIGS. 4 through 7.

In this example, a configuration is explained in which HARQ (Hybrid ARQ) is applied to HSDPA (High-Speed Downlink Packet Access) methods.

HSDPA methods have already been explained in the description of related art, and therefore an explanation is not here repeated. The layer structure shown in FIG. 1 is employed, with a MAC-d layer 2, MAC-c layer 3, and MAC-hs layer 4 existing below the RLC (Radio Link Control) layer 1, and with a transport channel layer 5 existing below the MAC layers 2, 3 and 4, to perform transmission and reception using a physical communication channel. With respect to the protocol data units (PDUs) of each of the layers, the configuration of FIG. 2, previously explained, is also employed.

Figure 4:
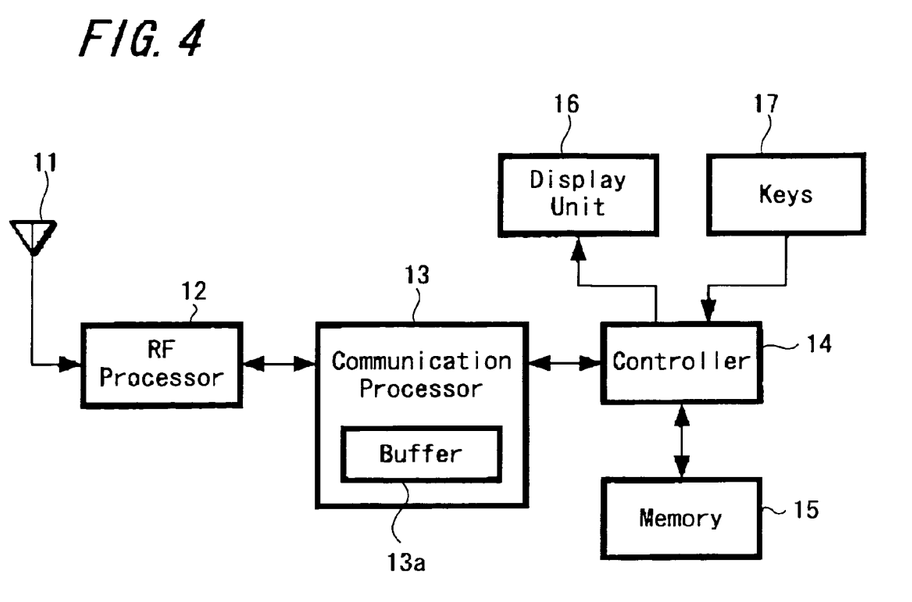
FIG. 4 is a block diagram showing an example of the configuration of a terminal according to an embodiment of the present invention.

The HSDPA method is employed in a system in which high-speed downlink data transmission is performed from a wireless telephone system base station to mobile phone units; first, an example of the configuration of a mobile phone unit is explained, referring to FIG. 4.

The mobile phone unit of this example includes an antenna 11 connected to an RF (high-frequency) processor 12 where wireless signals in a predetermined frequency band are received and transmission signals are wirelessly transmitted in a predetermined frequency band. As the wireless connection method, the W-CDMA method is employed, so that wireless connection is performed based on the CDMA (Code Division Multiple Access) method. The RF processor 12 is connected to a communication processor 13, so that received signals are demodulated and processing of demodulated data is performed, and in addition processing of data for transmission and modulation for transmission are also performed. In this communication processor 13, processing in the RLC layer in the layer structure shown in FIG. 2 and processing in each of the MAC layers are performed, and there is a buffer memory 13a necessary for the processing performed in respective layers. In FIG. 4, a single memory unit is shown as a buffer memory 13a, however a plurality of memory units may be provided for each layer. Alternatively, the storage area in a single memory unit may be divided to be used as memory of the different layers.

The received data and control data obtained in the communication processor 13 are supplied to a controller 14, which is control means to control the operation of the respective portions of the mobile phone unit, and received data which must be accumulated is stored in memory 15. Further, received audio data for a telephone call is supplied to voice circuitry not shown and is output. Data for transmission which is stored in the memory 15 is sent to the communication processor 13 under the control of the controller 14, and transmission processing is performed. The controller 14 is connected to a display unit 16, which displays information based on received data. Further, information on operation of keys 17 arranged on the mobile phone unit is supplied to the controller 14, and actions are performed based on key operations.

The controller 14 functions as control means which controls operations directly related to wireless communication, and also performs various kinds of processing relating to communication control. For example, the controller 14 functions as statistical information acquisition means to acquire statistical information indicating whether received data packets are successfully decoded or not, and based on the acquired statistical information, performs communication control processing to issue window size change requests. The details of this statistical information and window size change processing are described later on.

Figure 5:
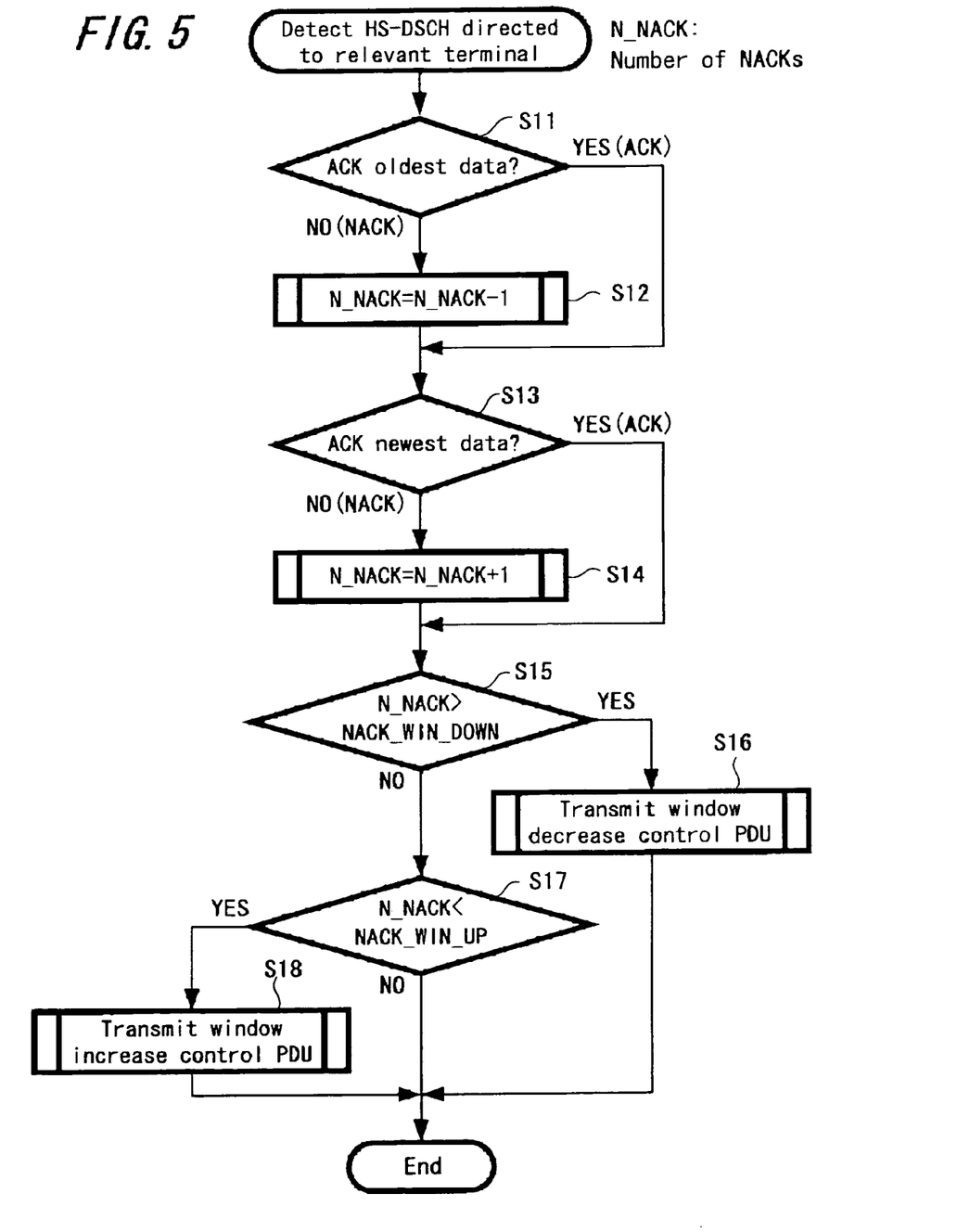
FIG. 5 is a flowchart explaining NACK rate calculation and control PDU transmission trigger processing according to an embodiment of the present invention.

Next, an example of processing for HSDPA high-speed downlink data transmission between a mobile phone unit configured as described above and a base station is explained, referring to the flowchart of FIG. 5. In the RLC layer 1 shown in FIG. 2, the window size, which is the number of data units handled in the layer, is normally set to 2047. The data of 2047 sequence numbers (SNs) is handled as a single unit and is accumulated in the buffer, and the accumulated data is passed to the upper layer.

In this embodiment, this window size of 2047 is changed according to communication conditions. Specifically, the size can be changed to 1024. In order to vary the setting of the window size, statistical information is acquired indicating whether received data packets have been successfully decoded or not. As such statistical information, the number of ACK signals or NACK signals occurring (the rates of occurrence) are used.

When one protocol data unit (PDU) of data is received, and it is judged based on error-correction decoding results that decoding has been performed correctly, an ACK signal is returned, as an acknowledgment response signal, to the base station which is the communication destination. When it is judged, based on the error-correction decoding results, that decoding has not been performed correctly, a NACK signal is returned, as a response signal indicating reception failure, to the base station which is the communication destination.

The rate at which nearest NACK signals occur is judged by statistical information acquisition means included in the controller 14. The flowchart of FIG. 5 is a flowchart showing the judging processing of the occurrence rate of NACK signals. Processing is explained below according to FIG. 5. Data received on the channel for reception of data directed to the relevant terminal is judged, and a judgment is made as to whether the response to the oldest received data at the interval for statistical analysis is an ACK signal or is a NACK signal (step S11). If the oldest data is a NACK signal, the value of N_NACK, which is the number of NACK signals, is reduced by 1 (step S12).

Next, a judgment is made as to whether the most recent received data is an ACK signal or is a NACK signal (step S13). If the newest data is a NACK signal, the value of N_NACK, which is the number of NACK signals, is increased by 1 (step S14).

Then, a judgment is made as to whether the value of N_NACK has exceeded a threshold value (NACK_WIN_DOWN) set in advance for reducing the window size (step S15). If this threshold value has been exceeded, a PDU including window size reduction control data is transmitted via the uplink channel to the base station (step S16). Further, a judgment is also made as to whether the value of N_NACK is equal to or less than the threshold value (NACK_WIN_UP) set in advance for increasing the window size (step S17), and when the value is equal to or less than the threshold value, a PDU including window size enlargement control data is transmitted via the uplink channel to the base station (step S18).

At a base station which has received window size reduction control data from the terminal, the window size in the RLC layer is for example changed from a size of 2047 SNs (sequence numbers) to 1024 SNs. Further, at a base station which has received window size enlargement control data, the window size in the RLC layer is for example changed from a size of 1024 SNs to 2047 SNs. Furthermore, within the terminal also, by transmitting window size reduction (or enlargement) control data, the window size in the RLC layer within the unit is similarly changed, and the amount of received data which is accumulated and processed in the buffer of the RLC layer is changed.

In the flowchart of FIG. 5, an example is shown in which control is performed in terms of the number of NACK data sets; however, similar control can be performed in terms of the number of ACK data sets. That is, when data is received, either ACK data or NACK data is output, so that the number of ACK signals issued and the number of NACK signals issued are inversely related, and the same control processing can be performed. The relation between the magnitudes of the threshold value for decreasing the window size (NACK_WIN_DOWN) and the threshold value for increasing the window size (NACK_WIN_UP) is (NACK_WIN_DOWN)>(NACK_WIN_UP).

In this way, the window size used in the RLC layer can be variably set based on the rate of occurrence of NACK signals or on the rate of occurrence of ACK signals. The rate of occurrence of NACK (or ACK) signals is determined by the value of N_NACK or of N_ACK and by the statistical analysis interval, and is calculated. Specifically, suppose that the statistical analysis interval is the total number N of nearest HS-DSCH TTIs allocated to the relevant terminal from the HS-SCCH information. A TTI is a transmission time interval of the physical channel; and the number of ACKs in N TTIs is then taken to be the ACK rate. Further, the number of NACKs in N TTIs is taken to be the NACK rate. When the radio wave propagation environment is not excellent, the ACK rate falls, and the NACK rate rises; the opposite is true when the radio wave propagation environment is excellent.

In calculating the NACK rate indicated in the flowchart of FIG. 5, for example, each time HS-DSCH TTI data transmitted from the base station to the mobile phone unit is detected, HARQ (Hybrid Automatic Repeat Request) statistical information is continuously acquired and updated, and the NACK rate (or ACK rate) is calculated.

Next, an example of data transmission is explained referring to FIGS. 6A to 6J. FIGS. 6A through 6E show the states of the terminal which is the data receiving side, and FIGS. 6F through 6J show the states of the base station which is the data transmitting side. The states in FIGS. 6A to 6J show the measures taken in this example upon occurrence of the same states as those shown in FIGS. 3A to 3J as an example of the prior art.

In FIGS. 6A to 6J, the horizontal axis is the time axis, and the transmission time intervals (TTIs) of physical channels are, for example, 2 ms for HSDPA-related physical channels, and 10 ms, 20 ms, 40 ms, or 80 ms for individual channels (DCHs). Time differences are set as offsets determined by the system for the TTI boundaries of the physical channels. The SN (Sequence Number) window in the RLC layer is set to 2047 in the initial state both on the transmitting side (the state in the base station in FIG. 6G), and on the receiving side (the state in the terminal station in FIG. 6A).

Figure 6A:
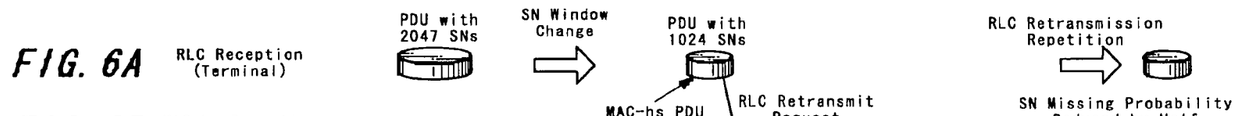
FIGS. 6A to 6J are timing charts showing a data transmission example (example of processing when the window is reduced) according to an embodiment of the present invention.
Figures 6B, 6C:
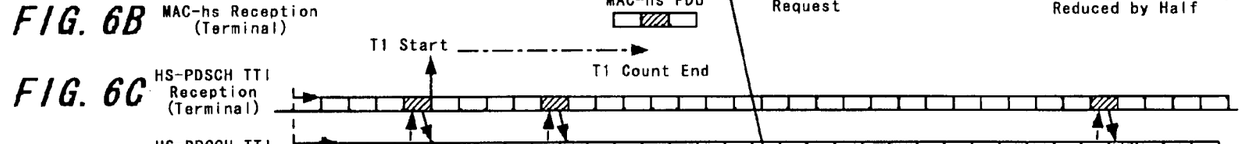
Figure 6D:
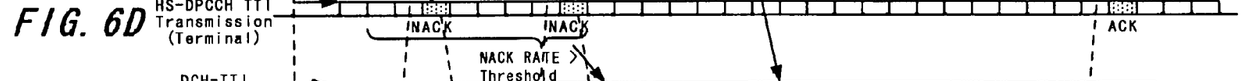
Figure 6E:
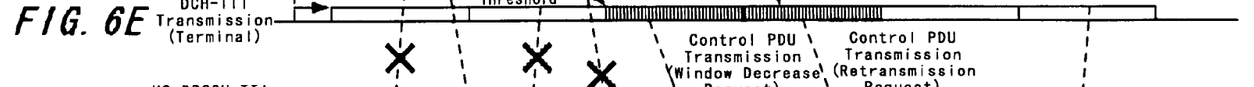
Figure 6F:
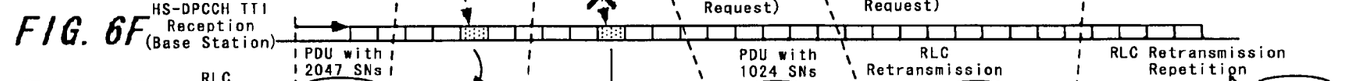
Figure 6G:
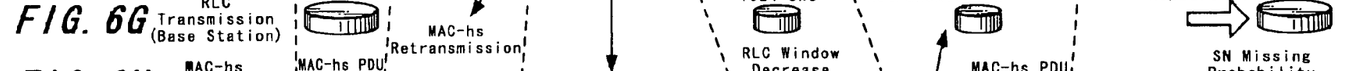
Figure 6H:
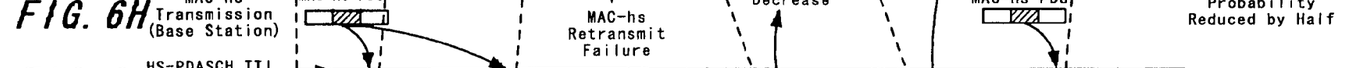
Figure 6I:
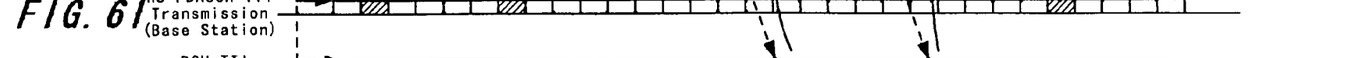

When communication is begun, transmission RLC PDUs having SN values within the SN window are sent in succession by the RLC layer on the base station side to the transmission MAC-hs layer, as shown in FIGS. 6G and 6H, and are processed as a MAC-hs PDU; and as shown in FIG. 6I, these are arranged at predetermined positions in the transmission channel at 2 ms intervals and are transmitted. The position of arrangement within the channel (interval) is determined for each terminal to which transmission is performed.

Signals transmitted from the base station are received on the terminal side at predetermined positions of the reception channel at 2 ms intervals, as shown in FIG. 6C. At this time, suppose that data have not been correctly received (decoded) on the receiving side, as indicated by an "x" symbol in FIGS. 6A to 6J. If data cannot be received correctly, reception failure information (NACK) is transmitted to the base station from the terminal on a transmission channel, as shown in FIG. 6D. Further, when data reception on the reception channel is begun, the timer T1 is started.

NACK data transmitted from the terminal is received on a physical reception channel at the base station, as shown in FIG. 6F. When this NACK data is received by the base station, a MAC-hs PDU with the same sequence number (SN) is retransmitted with the timing allocated to the terminal which is the target of transmission, as shown in FIG. 6I.

If the data of this retransmitted MAC-hs PDU also have not been correctly received (decoded) on the receiving side, as indicated by an "x" symbol in the figures, then NACK data is transmitted from the terminal to the base station, as described above; however, suppose that, as also indicated by an "x" symbol in the figures, an error also occurs in the uplink transmission of this NACK data, so that the NACK data cannot be discriminated at the base station. In this case, the MAC-hs PDU is not retransmitted from the base station. In FIGS. 6A to 6J, the case of a PDU with only one SN (sequence number) is shown; in actuality, however, NACK data is issued for PDUs with a plurality of SNs when the communication environment is degraded.

When the issuing of NACK data is repeated in this way, the NACK rate becomes greater than the threshold value (NACK_WIN_DOWN), and as shown in FIG. 6A, the window size handling PDUs in the receiving-side RLC layer is changed from 2047 SNs to 1024 SNs. Further, concurrently with this change on the terminal side, as shown in FIG. 6E, a control PDU including a window size reduction request is transmitted using a transmission channel to the base station. Upon receipt of this control PDU at the base station as in shown FIG. 6J, the window size handling PDUs in the transmitting-side RLC layer is changed from 2047 SNs to 1024 SNs, as shown in FIG. 6G.

Thereafter, as shown in FIG. 6C, because the data with the relevant sequence numbers (SNs) are not received during the time until the end of counting by the timer T1 which has been started, the MAC-hs PDU accumulated in the receiving buffer at this time is sent to the RLC layer. In the RLC layer, as shown in FIG. 6A, because there is data missing in the transferred PDU, a control PDU including a retransmission request is transmitted on a transmission channel from the terminal to the base station, as shown in FIG. 6E.

Figure 6J:
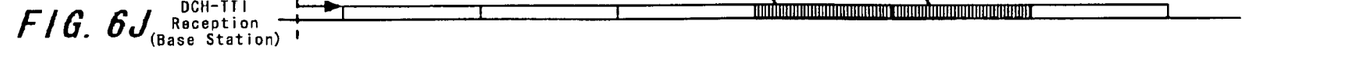

On the base station side, upon receiving the control PDU including the retransmission request, as shown in FIG. 6J, retransmission processing is performed with respect to the RLC PDU with a small window size in the RLC layer, as shown in FIG. 6G; a MAC-hs PDU is generated in the MAC-hs layer as shown in FIG. 6H; and the MAC-hs PDU is transmitted on the transmission channel as shown in FIG. 6I.

When, as shown in FIG. 6C, the PDU transmitted in this state is correctly received, an ACK signal is transmitted, as shown in FIG. 6D.

Next, an example of states when a window size which has been reduced as described above is enlarged is explained, referring to FIGS. 7A through 7J. FIGS. 7A through 7E show the states of a terminal which is the data receiving side, and FIGS. 7F through 7J show the states of the base station which is the data transmitting side; and FIGS. 7A through 7J correspond to FIGS. 6A through 6J.

Figure 7A:
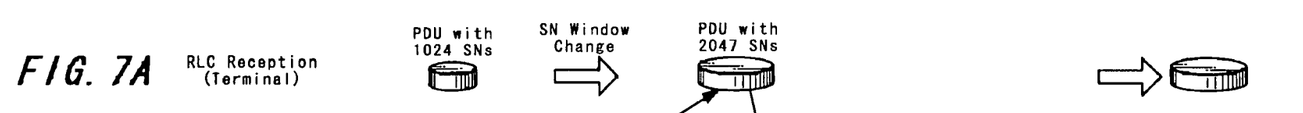
FIGS. 7A to 7J are timing charts showing a data transmission example (example of processing when the window is enlarged) according to an embodiment of the present invention.
Figures 7B, 7C, 7D:
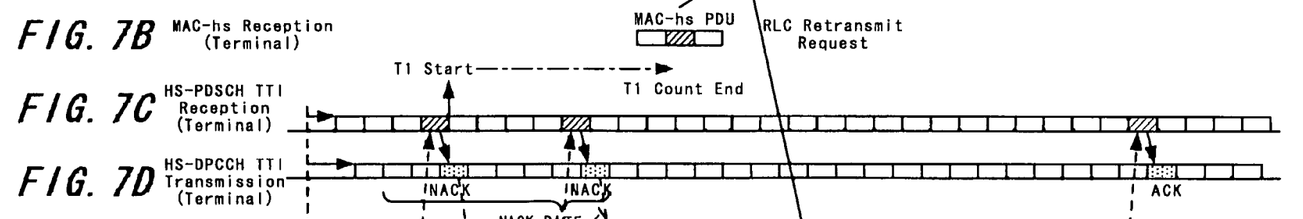
Figures 7E, 7F, 7G:
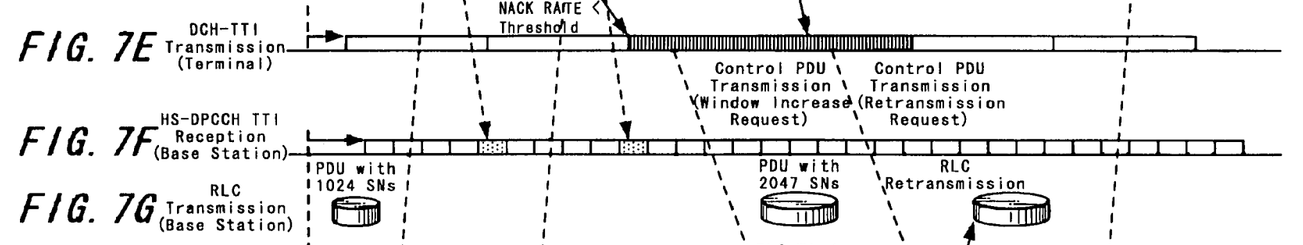
Figures 7H, 7I:
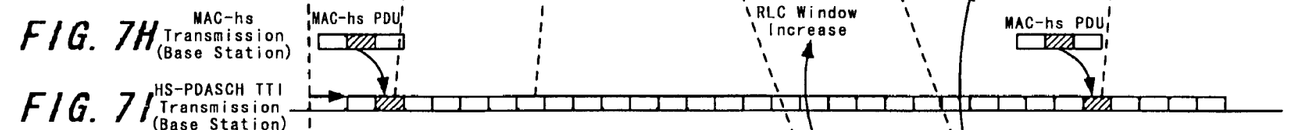

In the initial state shown in FIGS. 7A to 7J (the state shown on the utmost left side), the RLC layer window size is the reduced size of 1024 SNs. When communication is performed in this state, in the base station-side RLC layer, transmission RLC PDUs having SN values within the SN window are sent in succession to the transmitting MAC-hs layer, as shown in FIGS. 7G and 7H, and are processed as MAC-hs PDUs; and as shown in FIG. 7I, these are arranged in predetermined positions in the transmission physical channel at 2 ms intervals and are transmitted. On the terminal side, the PDUs are received at predetermined positions in the reception physical channel at 2 ms intervals, as shown in FIG. 7C.

Here, it is assumed that the radio wave propagation environment has changed to a favorable state, and the data has been correctly received (decoded) on the receiving side. In such a state in which data has been correctly received, as shown in FIG. 7D, reception acknowledgement information (ACK) is transmitted to the base station from the terminal on a transmission channel. Also, when data reception is begun on a reception channel, the timer T1 is started.

Then, as shown in FIG. 7F, ACK data transmitted from the terminal is received at the base station on the reception channel. When this ACK data is received at the base station, MAC-hs PDUs with other sequence numbers (SN) are transmitted in succession with the timing allocated to the terminal which is the transmission target, as shown in FIG. 7I. When this state continues, the NACK rate becomes smaller than the threshold value (NACK_WIN_UP), so that the window size for handling PDUs in the receiving-side RLC layer is changed from 1024 SNs to 2047 SNs. Simultaneously with the change on the transmitting side, a control PDU including a window size enlargement request is transmitted on the transmission channel from the terminal to the base station, as shown in FIG. 7E. At the base station, upon receiving this control PDU as shown in FIG. 7J, the window size for handling PDUs in the transmitting-side RLC layer is changed from 1024 SNs to 2047 SNs, as shown in FIG. 7G.

Thereafter, as shown in FIG. 7C, when counting by the timer T1 which has been started ends, the MAC-hs PDUs accumulated in the receiving buffer are sent to the RLC layer, as shown in FIG. 7B. In the RLC layer, as shown in FIG. 7A, when there is data missing from the transferred PDUs, a control PDU including a retransmission request is transmitted on the transmission channel from the terminal to the base station, as shown in FIG. 7E.

Figure 7J:
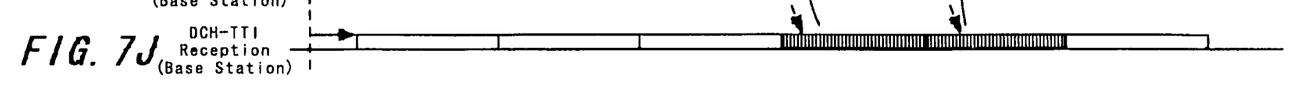

On the base station side, when this control PDU including the retransmission request is received as shown in FIG. 7J, RLC PDU retransmission processing is performed at the large window size in the RLC layer, as shown in FIG. 7G; a MAC-hs PDU is generated in the MAC-hs layer, as shown in FIG. 7H; and this MAC-hs PDU is transmitted on the transmission channel, as shown in FIG. 7I. If the PDU transmitted in this state is correctly received, as shown in FIG. 7C, then an ACK signal is transmitted, as shown in FIG. 7D.

As described above, by temporarily reducing the size of the RLC layer buffer by half in response to degradation of the radio wave propagation environment to reduce the number of PDUs which are subject to retransmission, and by returning the buffer size to its original value when the wireless propagation environment has again become excellent, the efficiency of data transmission is improved. That is, in the state in which the wireless propagation environment is degraded, the window size in the RLC layer of the base station is reduced by half, so that requests for transmission of new RLC data to the base station MAC-hs layer are suppressed. As a result, a discard timer which is a time resource and the number of retransmissions can be dedicated to minimized PDU processing with a limited number of PDUs. Hence the rate of success of PDU retransmission is improved, and the rate of discarding the RLC layer buffer can also be reduced, resulting in improved transmission efficiency.

In particular, in this embodiment the rate of correct decoding (ACK rate) or the rate at which correct decoding is not possible (NACK rate) indicated by statistical information in the terminal are described in terms of the number of data units which have or have not been correctly decoded within the nearest fixed time interval, so that control can be executed based on the latest radio wave propagation environment conditions. Further, the number of data units which have or have not been correctly decoded within the nearest fixed time interval are described in terms of the number of time intervals of packets allocated to the terminal, so that the ACK rate or NACK rate can be judged correctly and easily.

Moreover, when the radio wave propagation environment returns to a favorable state, the original window size is restored, so that in a favorable radio wave propagation environment the originally intended state of high-speed data transmission can be maintained, and high-speed transmission properties are not sacrificed.

In the above-described embodiment, an example is given in which HARQ technology is used to perform high-speed data transmission from a base station to a terminal, which is applied to the HSDPA method of a UMTS system which is a wireless telephone communication system employing W-CDMA; needless to say, application to other wireless data transmission methods is also possible. Basically, as long as the method employs HARQ to issue retransmission requests and performs transmission based on error-correction decoding results for received data packets, the present invention can be applied to other wireless data communication using various methods than wireless telephone communication.

In the above-described aspect, as the change in window size, a normal size of 2047 SNs is reduced by approximately half to 1024 SNs; however, these window sizes are examples, and the invention is not limited to those values. Further, instead of performing changes only in two stages, the window size may be changed over a greater number of stages, according to the current radio wave propagation environment and other conditions.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A data transmission method in which retransmission requests are issued based
   on the results of error-correction decoding of received data packets to perform data transmission, comprising:
   acquiring statistic information indicating whether received data packets have been successfully decoded or not; and
   transmitting to a transmission source requests to change a window size, which is the number of data units handled in a predetermined layer, based on the rate at which correct decoding has been made or the rate at which correct decoding has not been made, which is indicated by said statistical information,
   wherein, when the rate at which correct decoding has not been made is greater than a stipulated value or when the rate at which correct decoding has been made is equal to or less than the stipulated value, said window size change request is a request to reduce the window size of a radio link control layer protocol, the rate at which correct decoding has been made or the rate at which correct decoding has not been made is described in terms of the number of data units which have been decoded correctly, or the number of data units which have not been decoded correctly, within a nearest predetermined time interval, and the data transmission is via HSDPA high-speed downlink data transmission which includes a mobile phone.

2. The data transmission method according to claim 1, wherein
   when the rate at which correct decoding has not been made is equal to or less than a stipulated value, or the rate at which correct decoding has been made is greater than the stipulated value, said window size change request is a request to enlarge the window size of the radio link control layer protocol.

3. The data transmission method according to claim 1, wherein
   the number of data units which has been or has not been correctly decoded within said nearest predetermined time interval is described in terms of a number of packet time intervals allocated to the relevant station.

4. A data transmission apparatus in which retransmission requests are issued based on the results of error-correction decoding of received data packets to perform data transmission with a transmission source, comprising:
   a statistical information acquisition unit configured to acquire statistical information indicating whether received data packets have been successfully decoded; and
   a control unit configured to, based on the rate at which correct decoding has been made or the rate at which correct decoding has not been made, which is indicated by means of statistical information obtained by said statistical information acquisition unit, transmit to the transmission source requests to change a window size, which is the number of data units handled in a predetermined layer, wherein, when the rate at which correct decoding has not been made is greater than a stipulated value or when the rate at which correct decoding has been made is equal to or less than a stipulated value, a window size change request issued by said control unit is a request to reduce the window size of a radio link control layer protocol, the control unit is configured to describe the rate at which correct decoding has been made or the rate at which correct decoding has not been made in terms of the number of data units which have been decoded correctly, or the number of data units which have not been decoded correctly, within a nearest predetermined time interval, and the data transmission is via HSDPA high-speed downlink data transmission which includes a mobile phone.

5. The data transmission apparatus according to claim 4, wherein when the rate at which correct decoding has not been made is equal to or less than a stipulated value, or the rate at which correct decoding has been made is greater than a stipulated value, a window size change request issued by said control unit is the request to enlarge the window size of the radio link control layer protocol.

6. The data transmission apparatus according to claim 4, wherein the number of data units which has been or has not been correctly decoded within said nearest predetermined time interval judged by said statistical information acquisition unit is described in terms of a number of packet time intervals allocated to the relevant station.

7. The data transmission method according to claim 1, wherein when said window size of said radio link control layer protocol is reduced, said window size is temporarily reduced by approximately one half.

8. The data transmission method according to claim 7, wherein when wireless communication conditions return to normal, said window size is returned to its original size from said reduced window size.

9. The data transmission method according to claim 8, wherein said original size is approximately 2047 sequence numbers.

10. The data transmission apparatus according to claim 4, wherein when said window size of said radio link control layer protocol is reduced, said control unit is configured to issue a reduced window size change request which reduces said window size by approximately one half.

11. The data transmission apparatus according to claim 10, wherein when wireless communication conditions return to normal, said control unit is configured to issue an original window size change request which returns said reduced window size to its original size.

12. The data transmission apparatus according to claim 11, wherein said control unit is configured to issue said original window size change request which returns said window size to said original size of approximately 2047 sequence numbers.

* * * * *